United States Patent [19]
Katakura et al.

[11] Patent Number: 5,434,729
[45] Date of Patent: Jul. 18, 1995

[54] MAGNETIC DISC DRIVING MOTOR

[75] Inventors: Kouichi Katakura; Mituru Ide, both of Shimosuwa, Japan

[73] Assignee: Sankyo Seiki Mfg. Co., Ltd., Nagano, Japan

[21] Appl. No.: 123,740

[22] Filed: Sep. 20, 1993

[30] Foreign Application Priority Data

Sep. 22, 1992 [JP] Japan .............................. 4-071897 U

[51] Int. Cl.⁶ .................................................. G11B 5/012
[52] U.S. Cl. ................................................... 360/99.08
[58] Field of Search ....................... 360/99.08; 310/156

[56] References Cited

U.S. PATENT DOCUMENTS

| | | | |
|---|---|---|---|
| 4,535,373 | 8/1985 | Schuh | 360/99.08 X |
| 4,604,665 | 8/1986 | Muller et al. | 360/99.08 X |
| 4,779,165 | 10/1988 | Elsaesser et al. | 360/99.08 X |
| 4,922,406 | 5/1990 | Schuh | 360/97.03 |
| 5,047,677 | 9/1991 | Mineta et al. | 360/99.08 X |
| 5,128,819 | 7/1992 | Elsaesser et al. | 360/99.08 |

*Primary Examiner*—John H. Wolff
*Attorney, Agent, or Firm*—McAulay Fisher Nissen Goldberg & Kiel

[57] ABSTRACT

A magnetic disc driving motor comprises a hub for mounting a magnetic disc thereon, a motor stator for driving the hub rotationally, and a motor rotor formed in the hub and arranged to face the stator at a predetermined gap. A support is provided for supporting a bearing member for bearing the hub rotatably. A stator supporting portion is formed integrally with the support for supporting the stator. A motor frame is formed to cover the stator and the rotor. The motor frame is formed of a thin sheet. The motor frame is fixed to the motor frame by a mechanical device or an adhesive. Another similar motor arrangement includes a hub with a rotatable central shaft. In this arrangement, the frame, stator support and bottom seal for the bearings are formed of a thin sheet. The stator support is a U-shape which is force fit into a recess between the bearing holder and coil of the motor.

9 Claims, 3 Drawing Sheets

MAGNETIC DISC DRIVING MOTOR

BACKGROUND OF THE INVENTION a) Field of the Invention

The present invention relates to a magnetic disc driving motor and, more particularly, to a construction of a motor frame covering the bottom of the motor.

b) Background Art

A magnetic disc driving motor of the prior art is exemplified in FIG. 3. As shown in FIG. 3, a frame 1 is formed at its center integrally with a stationary shaft 2, and two ball bearings 3 and 3 are fixed on the outer circumference of the stationary shaft 2. On the outer circumferences of the ball bearings 3 and 3, there is fitted a hub 4 which has its center portion formed into a cylinder. This cylindrical central portion has its upper and lower end portions opened so that it may mount a magnetic disc (not shown) on its outer circumference. In the upper end opening of the hub 4, moreover, a magnetic seal 6 is fixed by an adhesive 7 for establishing a seal between the hub 4 and the stationary shaft 2 with a not-shown magnetic fluid so that the oil in the ball bearings 3 and 3 may not splash onto the mounted magnetic disc or the like.

The frame 1 is formed with a dish-shaped portion 1a which extends generally in a dish shape from the root of the stationary shaft 2. In the recess of the dish-shaped portion 1a, there is arranged a stator core 8 which has its inner end fixed on the lower portion of the stationary shaft 2. This stator core 8 is equipped with a plurality of projecting poles, each of which is wound with a coil 10. On the other hand, the stator core 8 has its outer circumference faced at a predetermined gap by the inner circumference of a rotor magnet 9 which is fixed on the inner circumference of the hub 4. Stator core 8, rotor magnet 9 and the like together constitute the motor, which is covered with the frame 1. As the rotor magnet 9 is rotationally driven, the hub 4 is integrally turned.

In the magnetic disc driving motor of the prior art described above, the frame 1 is integrally formed by cutting an aluminum material, for example, into the stationary shaft 2 and the dish-shaped portion 1a. When, however, this dish-shaped portion 1a is cut, this cutting is accompanied by a difficulty in reducing the thickness to a predetermined value or less due to the machining limit. This raises a serious problem in making a thinner motor. Moreover, when the frame 1 is to be cut, it is subject to a stress such as a chucking force for fixing it in the machine or a cutting force by the cutting tool. Thus, another problem arises in that the machining precision is deteriorated. Furthermore, since the cutting operation takes a long time, still another problem exists in that the cost for the parts is raised.

OBJECT AND SUMMARY OF THE INVENTION

The present invention has been conceived to eliminate those problems and has as a primary object the provision of a magnetic disc driving motor in which the frame structure is improved to reduce not only the thickness of the motor while ensuring a desired precision but also the parts cost.

In accordance with one form of the invention, a magnetic disc driving motor comprises a hub for mounting a magnetic disc thereon, a motor stator for driving the hub rotationally, a motor rotor formed in said hub and arranged to face the stator at a predetermined gap, a support supporting a bearing member for bearing the hub rotatably, a stator supporting portion formed integrally with the support for supporting the stator and motor frame formed to cover the stator and rotor. The motor is formed of a thin sheet. Means are included for fixing the motor frame to the support.

In accordance with another form of the invention, a disc driving motor comprises a hub for mounting a magnetic disc thereon, the hub including a rotatable shaft, a motor stator for driving the hub rotationally, a motor rotor formed in the hub and arranged to face the stator at a predetermined gap, bearing elements for the rotatable shaft, a holder for positioning the bearing elements with respect to the rotatable shaft, a stator supporting portion for supporting the stator and a motor frame formed to cover the stator and the rotor. The motor frame is formed of a thin sheet and is disposed in part beneath the stator supporting portion.

For a better understanding of the present invention, reference is made to the following description and accompanying drawings while the scope of the invention will be pointed out in the appended claims.

DETAILED DESCRIPTION OF THE INVENTION AND PREFERRED EMBODIMENTS

Figure 1:
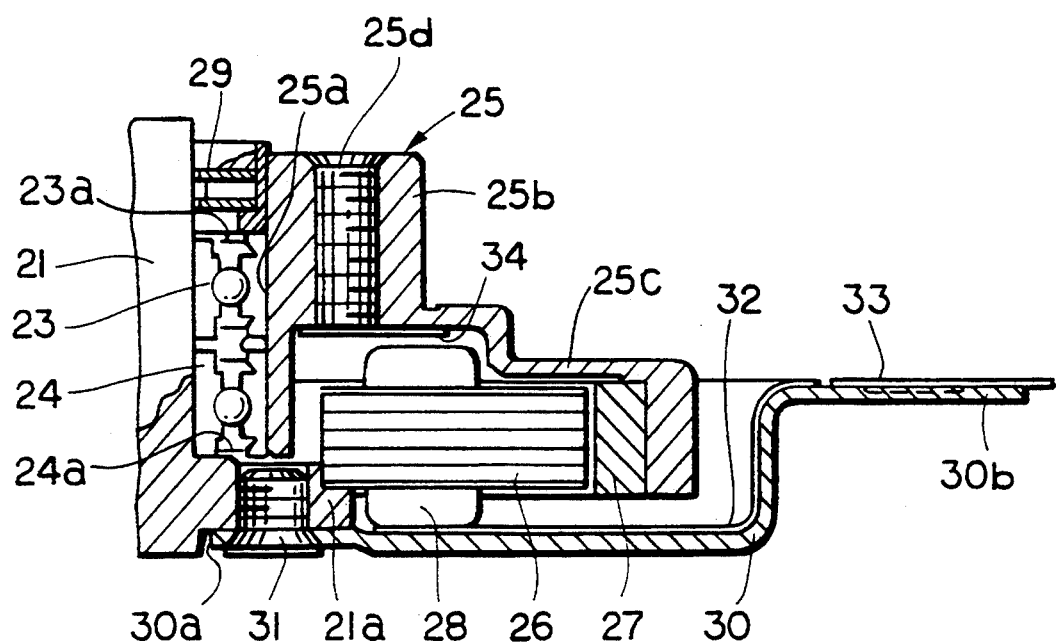
FIG. 1 illustrates a section showing a first embodiment of the magnetic disc driving motor of a fixed shaft type according to the present invention.

A first embodiment of the magnetic disc driving motor according to the present invention will be described in the following with reference to the accompanying drawings. In FIG. 1, reference numeral 21 designates a support which is cylindrically formed from a magnetic metal such as iron. A core support 21a is integrally extended from the lower end of the support 21. On this support 21, there are fitted and fixed as bearing members the inner races of a pair of ball bearings 23 and 24 which are vertically juxtaposed to each other. On the outer races of the ball bearings 23 and 24, there is fitted and fixed the center hole 25a of a hub 25 so that this hub 25 is rotatably supported by the support 21. The ball bearings 23 and 24 are individually equipped at their upper and lower end faces with sealing sheets 23a and 24a.

The hub 25 is integrally formed at its upper portion with a cylindrical portion and at its lower portion with a generally dish-shaped rotor yoke 25c. Thus, a magnetic disc (not shown) is mounted on the outer circumference of the cylindrical portion. In the upper portion of the center hole 25a of the hub 25, there is mounted a magnetic seal 29 for confining a magnetic fluid (not shown) between the support 21 and the hub 25 so that the oil mist to be generated from the ball bearings 23 and 24 may be prevented from splashing onto the mounted magnetic disc or the like.

In this case, the support 21 may desirably be made of a magnetic material having a high magnetic permeability such as carbon steel or stainless steel of the martensite group. Thanks to this construction, a closed loop is formed by the magnetic seal 29 and the support 21 so that the magnetic fluid is magnetically confined. Moreover, the hub 25 has its cylindrical portion 25b bored with a threaded hole 25d which extends vertically, as shown in FIG. 1. Into this threaded hole 25d, there is driven a screw for fastening a holder (although not shown) for holding the magnetic disc. A seal 34 is adhered to the lower face of the cylindrical portion 25b, for sealing the lower opening of the threaded hole 25d.

On the other hand, a stator core 26 is fixed on the stator supporting portion 21a of the support 21, and a rotor magnet 27 is fixed on the inner circumference of the rotor yoke 25c of the hub 25. The stator core 26 is equipped with a plurality of projecting piles, each of which is wound with a coil 28. The stator core 26 has its outer circumference faced at a predetermined gap by the inner circumference of the rotor magnet 27. The stator core 26 and the coil 28 constitute together the stator unit of the motor, and the rotor yoke 25c and the rotor magnet 27 constitute together the rotor unit of the motor. As the coil 28 is supplied with a predetermined current, the stator core 26 is magnetized to drive the rotor magnet 27 rotationally so that the hub 25 is integrally turned.

The central portion 30a of a motor frame 30, on the other hand, is fixed by a screw 31 to the bottom face of the stator supporting portion 21a of the support 21. The motor frame 30 is made of a thin sheet to cover the motor composed of the aforementioned stator core 26, coil 28 and rotor magnet 27. The motor frame 30 is made of a thin film of a magnetic metal such as iron and is pressed into a predetermined shape, as shown. Since the motor frame 30 is thus formed by pressing, a desired sizing accuracy can be preferably achieved. In order to effect electric insulation with respect to the coil 28, a sheet of insulating paper 32 is adhered to the inner face of the motor frame 30 thus formed. To the upper face of a flange 30 extending outward from the motor frame 30, on the other hand, there is adhered a flexible base 33 for transferring electricity between the motor and an external control circuit.

Figure 2:
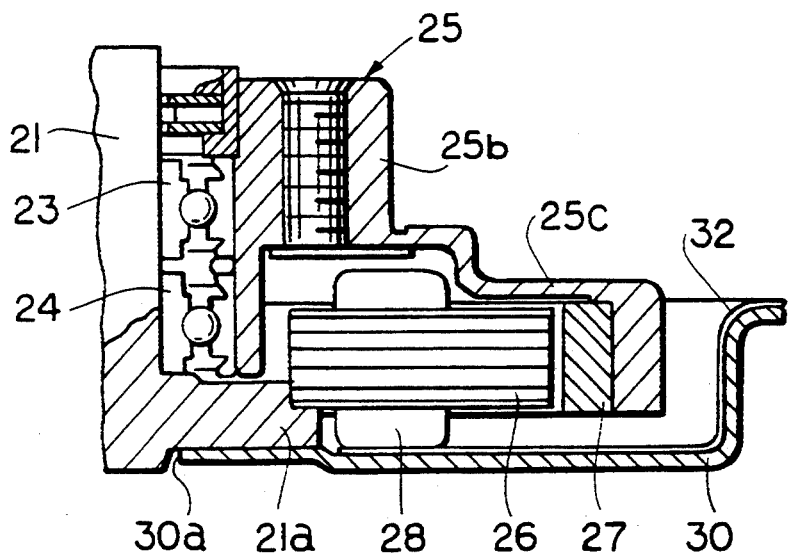
FIG. 2 illustrates a section showing a second embodiment of the invention for a magnetic disc driving motor of type referred to in FIG. 1.
Figure 3:
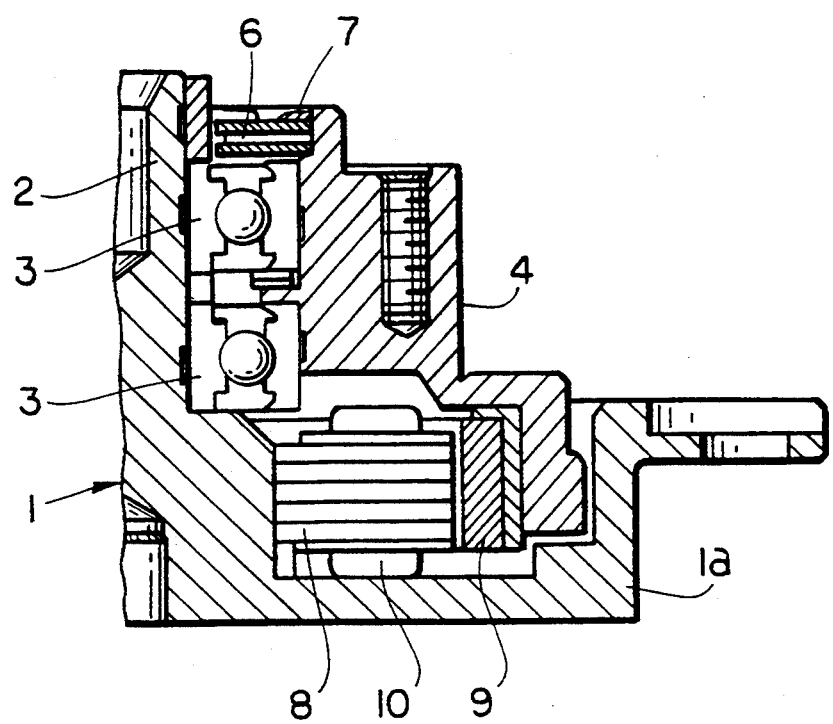
FIG. 3 illustrates a section showing a magnetic disc driving motor of the prior art.

FIG. 2 shows a second embodiment of the present invention, in which the central portion 30a of the motor frame 30 made of a thin sheet is bonded and fixed to the bottom face of the stator supporting portion 21a of the support 21. Since the remaining construction is made identical to that of the foregoing embodiment of FIG. 1, the detailed description of the construction will be omitted.

Incidentally, the first and second embodiments thus far described just embody the present invention. The means for fixing the support 21 and the motor frame 30 should not be limited to the screws or the adhesion but can be modified in various manners without departing from the present invention, such as a welding or caulking method.

Figure 4:
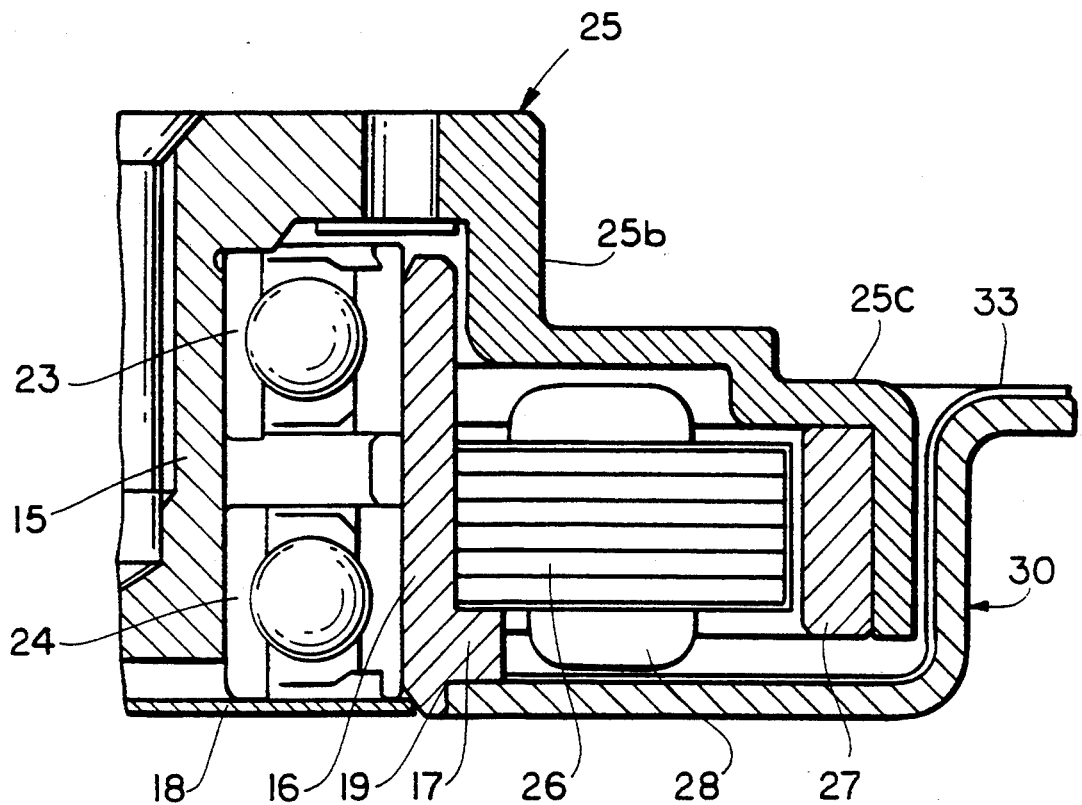
FIG. 4 illustrates a third embodiment of the invention for a magnetic disc driving motor of the rotating shaft type.

Referring now to FIG. 4, a magnetic disc motor of the rotating shaft type is shown incorporating a third embodiment of the invention. There a hub 25 with cylindrical portion 25b is rotatable around a common shaft 15 which forms part of the hub. The hub also includes a rotor yoke 25c and rotor magnet 27 fixed on the inner circumference of the rotor yoke 25c. Bearings 23 and 24 are arranged between the common shaft of the hub 25 and a bearing holder 16. The bearing holder includes an extension forming a core support 17 for the stator core 26. A magnetic seal 18 is arranged beneath the bearings and within the bearing holder to retain and confine the oil used to lubricate the bearings. The motor frame 30, which is manufactured by being pressed to a thin sheet as in the earlier embodiments, is inserted in a stepped portion 19 of the bearing holder and affixed by adhesive bonding. An insulating paper 33 is arranged inside the motor frame to insulate the frame from the coil 28.

Figure 5:
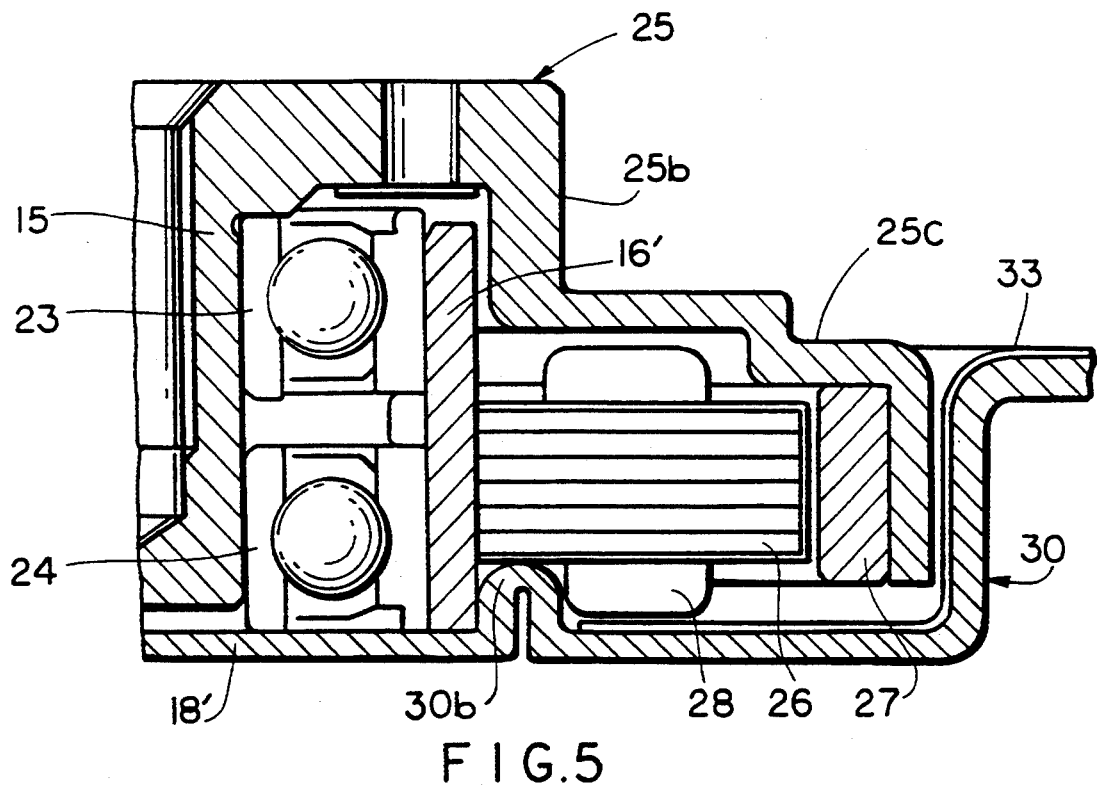
FIG. 5 illustrates a fourth embodiment of the invention for a magnetic disc driving motor of the type shown in FIG. 4.

In FIG. 5, a similar motor of the rotating shaft type embodies the fourth embodiment of the invention. Here the motor frame 30 is formed integrally with the core support 30b and the seal 18'. The bearing holder 16' is formed as a separate element from the core support. The integral motor frame, core support and seal is mounted to the motor by inserting the core support by force fit into a space beneath the core 26 and between the bearing holder and the coil 28. The motor frame, core support and seal is made by pressing magnetic material into a thin sheet.

As is now apparent from the above description, the magnetic disc driving motor of the present invention is constructed such that the motor frame is formed of a thin sheet and has its central portion fixed on the support supporting the bearings. As a result, the motor frame can be thinned to make the motor thinner. Moreover, since the motor frame can be formed by pressing an iron sheet or the like, a predetermined accuracy can be achieved, and the motor frame can be manufactured easily and quickly to drop the cost for the parts drastically.

While the foregoing description and drawings represent the preferred embodiments of the present invention, it will be obvious to those skilled in the art that various changes and modifications may be made therein without departing from the true spirit and scope of the present invention.

What is claimed is:

1. A magnetic disc driving motor comprising:
    a hub for mounting a magnetic disc thereon;
    a motor stator having a core for driving said hub rotationally;
    a motor rotor formed in said hub and arranged to face said stator at a predetermined gap;
    a support supporting a bearing member for bearing said hub rotatably;
    a stator supporting portion formed integrally with said support for supporting said stator; and
    a motor frame formed as a base plate to cover said stator and said rotor, said motor frame being formed of a thin sheet which surrounds the rotor and extends beneath and adjacent to the stator core, and
    means for fixing said motor frame to said support.

2. The magnetic disc driving motor according to claim 1, wherein said motor frame is formed by pressing the thin sheet.

3. The magnetic disc driving motor according to claim 1, wherein said means for fixing includes a screw element.

4. The magnetic disc driving motor according to claim 1 wherein said means for fixing includes an adhesive for bonding the motor frame to the support.

5. A magnetic disc driving motor comprising:

a hub for mounting a magnetic disc thereon, said hub including a rotatable shaft;

a motor stator having a core for driving said hub rotationally;

a motor rotor formed in said hub and arranged to face said stator at a predetermined gap;

bearing elements for said rotatable shaft;

a holder for positioning said bearing elements with respect to said rotatable shaft;

a stator supporting portion for supporting said stator; and a motor frame formed as a base plate to cover said stator and said rotor; said motor frame being formed of a thin sheet which surrounds the rotor and extends beneath and adjacent to the stator core; said motor frame being disposed in part beneath said stator supporting portion.

6. The motor of claim 5 wherein said holder and said stator supporting portion are an integral unit and said motor frame is affixed to an indentation in said unit.

7. The motor of claim 5 including a seal disposed beneath said bearings.

8. The motor of claim 7 wherein said motor frame, stator supporting portion and seal are an integral unit and formed as a thin sheet.

9. The motor of claim 8 wherein said stator supporting portion is a U-shaped element which is force fit between the holder and coil of said stator.

* * * * *